US 10,992,206 B2

(12) United States Patent
Jung et al.

(10) Patent No.: US 10,992,206 B2
(45) Date of Patent: Apr. 27, 2021

(54) FIELD DISCHARGE RESISTOR UNIT AND SYNCHRONOUS MOTOR INCLUDING SAME

(71) Applicant: Hyundai Electric & Energy Systems Co., Ltd., Seoul (KR)

(72) Inventors: Seung-Wook Jung, Ulsan (KR); Moo-Jong Jeon, Ulsan (KR); Je-Geun Oh, Ulsan (KR); Chung-Man Jang, Ulsan (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 140 days.

(21) Appl. No.: 16/324,306

(22) PCT Filed: Aug. 17, 2017

(86) PCT No.: PCT/KR2017/008964
§ 371 (c)(1),
(2) Date: Feb. 8, 2019

(87) PCT Pub. No.: WO2018/034513
PCT Pub. Date: Feb. 22, 2018

(65) Prior Publication Data
US 2019/0222101 A1    Jul. 18, 2019

(30) Foreign Application Priority Data
Aug. 19, 2016  (KR) .................. 10-2016-0105600

(51) Int. Cl.
*H02K 11/00*    (2016.01)
*H02K 9/06*    (2006.01)
(Continued)

(52) U.S. Cl.
CPC ............... *H02K 11/26* (2016.01); *H02K 9/06* (2013.01); *H02K 11/0094* (2013.01); *H02K 19/02* (2013.01); *H02K 19/14* (2013.01)

(58) Field of Classification Search
CPC .... H02K 11/26; H02K 19/02; H02K 11/0094; H02K 9/06; H02K 19/14; H02K 11/00–11/40; H02K 19/00–19/38
(Continued)

(56) References Cited

U.S. PATENT DOCUMENTS 3,575,622 A * 4/1971 Nielson .................. H02K 17/16
                                                        310/166
4,319,216 A * 3/1982 Ikeda ....................... H01C 3/02
                                                        310/72
(Continued)

FOREIGN PATENT DOCUMENTS

JP    6-46217    11/1994
JP    6-80366    11/1994
(Continued)

OTHER PUBLICATIONS

Machine Translation, NANBA, JP-09238454-A, Sep. 1997. (Year: 1997).*

*Primary Examiner* — Thomas Truong
(74) *Attorney, Agent, or Firm* — Mintz Levin Cohn Ferris Glovsky and Popeo, P.C.; Peter F. Corless

(57) ABSTRACT

A field discharge resistor unit according to an embodiment of the present invention is a device coupled to a rotary shaft of a synchronous motor and connected to a coil wound on a rotor of the synchronous motor, to reduce a magnitude of an electric current flowing through the coil wound on the rotor, and comprises: a hub which has a receiving space therein and is coupled to the rotary shaft of the synchronous motor so that a rotary movement of the hub matches that of the shaft; and at least one conductor disk received in the
(Continued)

receiving space of the hub and may function as a resistor when an electric current flows therethrough.

15 Claims, 10 Drawing Sheets

(51) Int. Cl.
  *H02K 19/02*   (2006.01)
  *H02K 11/26*   (2016.01)
  *H02K 19/14*   (2006.01)
(58) Field of Classification Search
  USPC .............................. 310/68 A–68 D, 68 R, 62
  See application file for complete search history.

(56) References Cited

U.S. PATENT DOCUMENTS

| | | | |
|---|---|---|---|
| 4,672,248 A | | 6/1987 | Heyne et al. |
| 4,980,595 A | * | 12/1990 | Arora .................... H02K 16/02 |
| | | | 310/156.69 |
| 6,924,726 B2 | * | 8/2005 | Ekwall ................... H01C 1/082 |
| | | | 101/104 |
| 2006/0066168 A1 | | 3/2006 | Shoykhet |
| 2015/0069879 A1 | | 3/2015 | Papini et al. |

FOREIGN PATENT DOCUMENTS

| | | | |
|---|---|---|---|
| JP | 09-238454 | | 9/1997 |
| JP | 09238454 A | * | 9/1997 |

* cited by examiner

【FIG. 1】
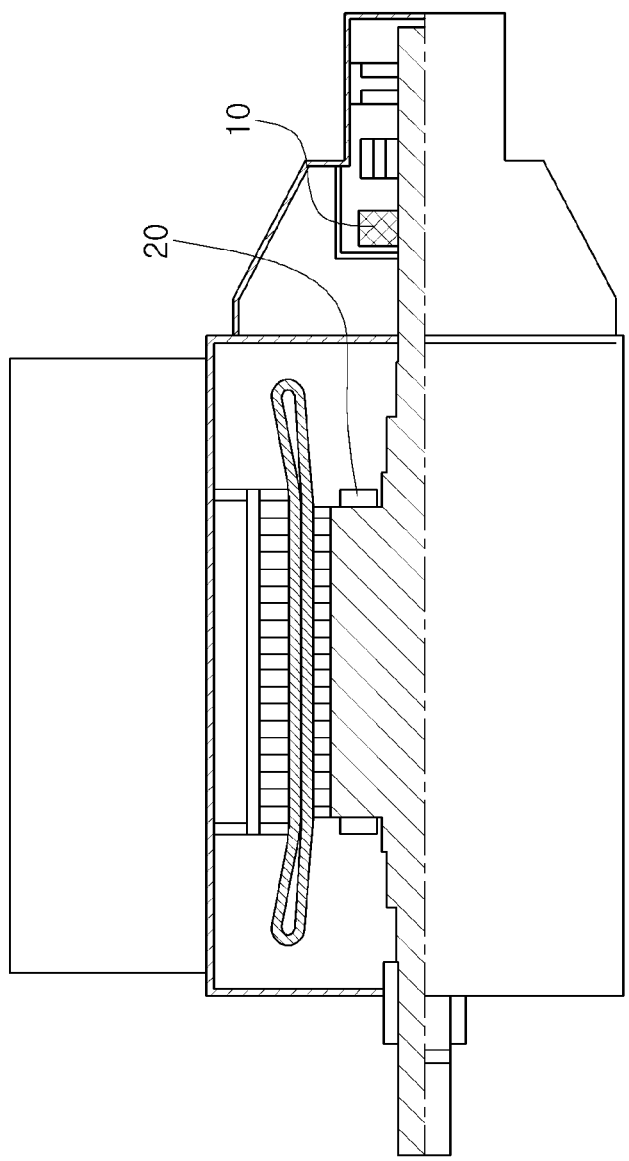

[FIG. 2]
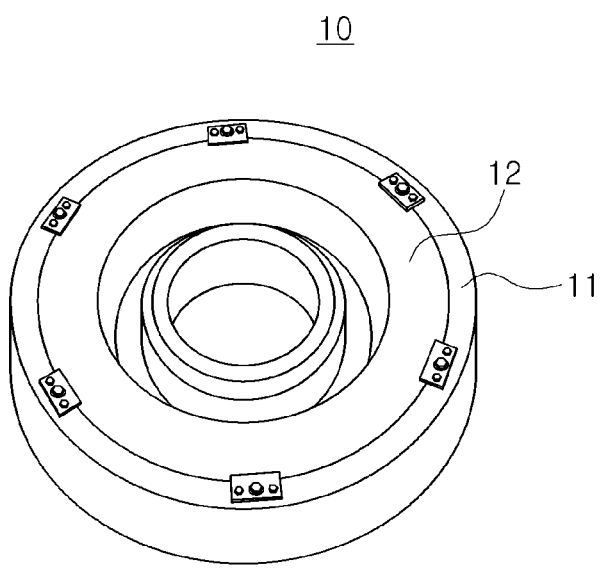

[FIG. 3]
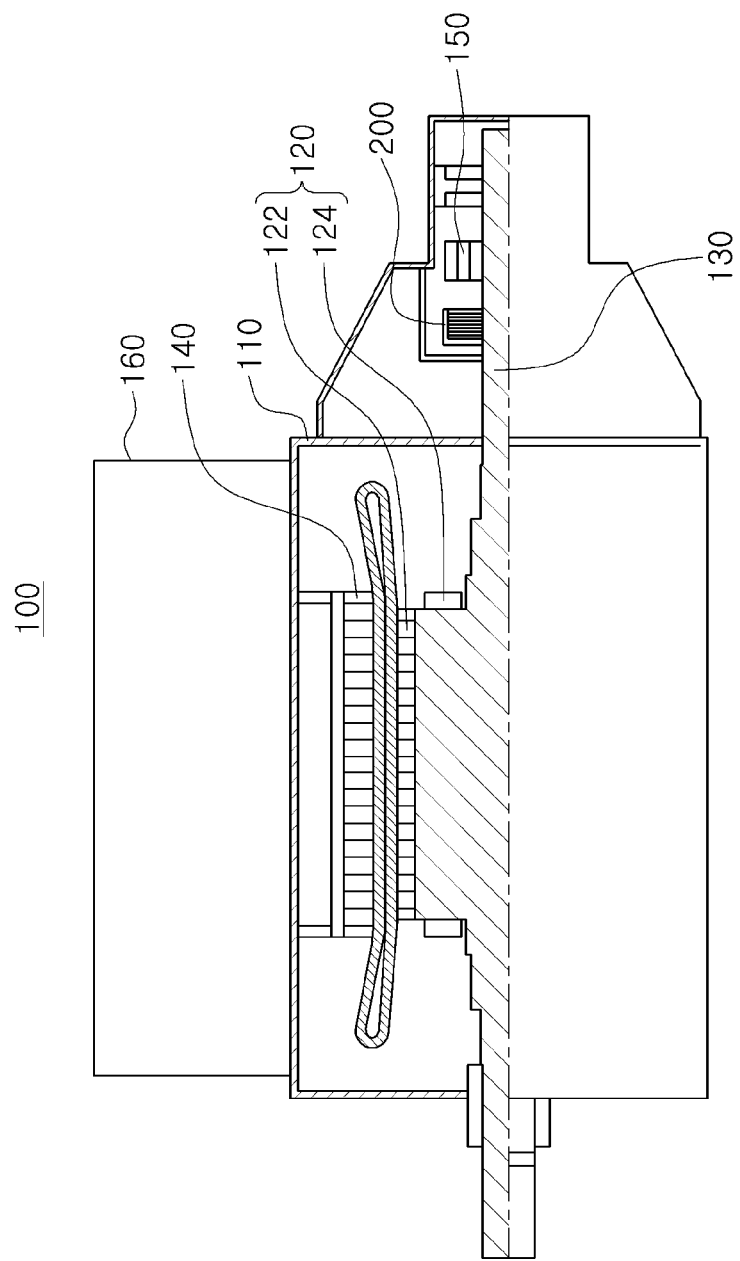

[FIG. 4]
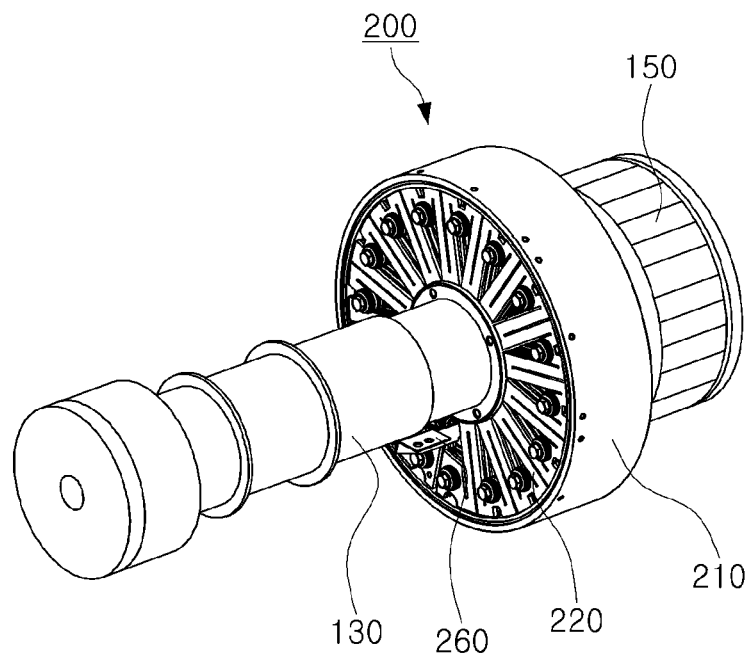

[FIG. 5]
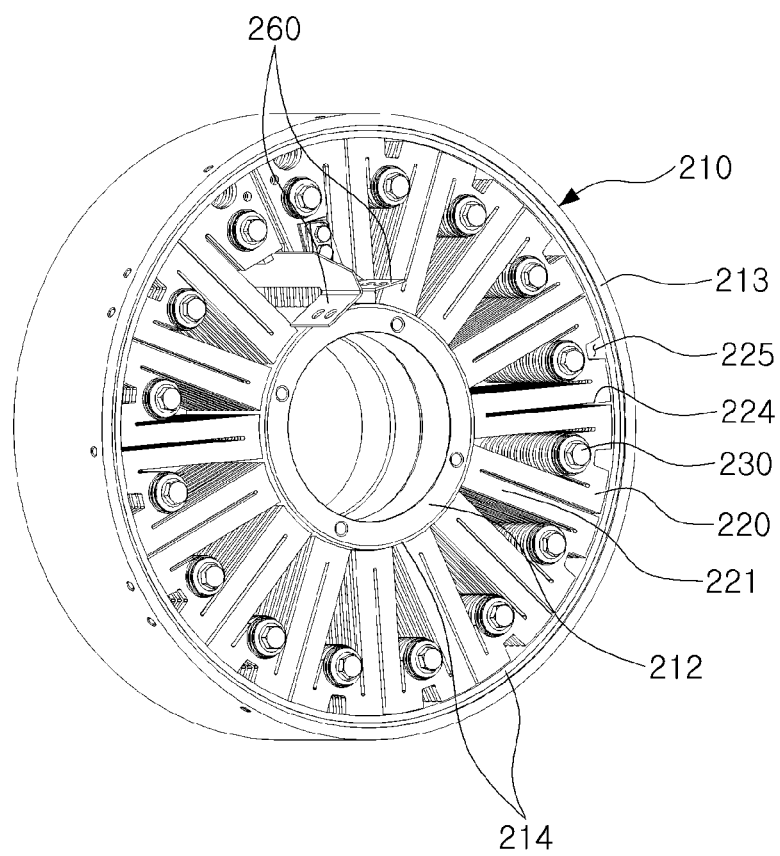

[FIG. 6]
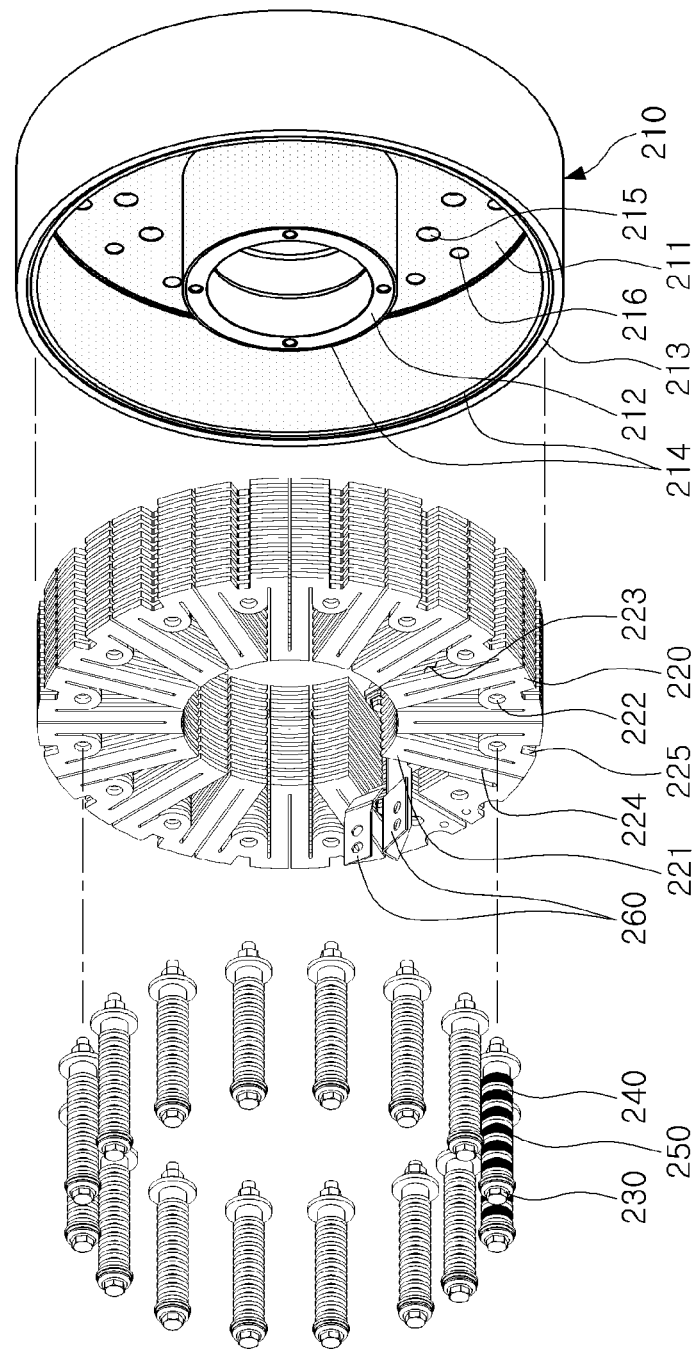

[FIG. 7]
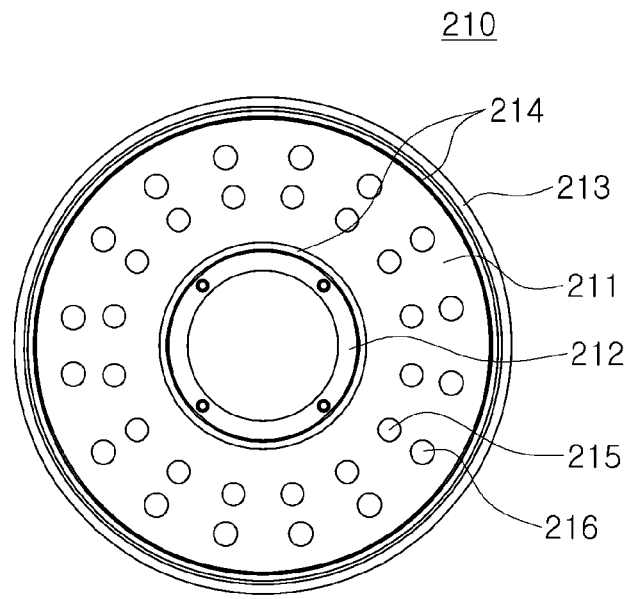
[FIG. 8]
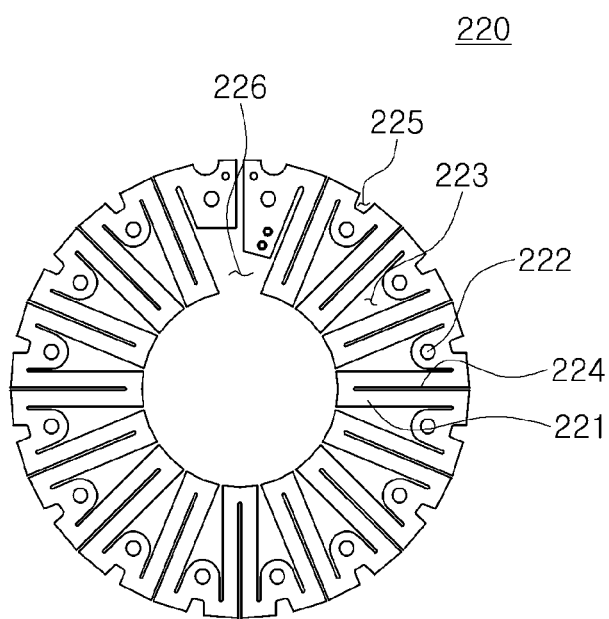

[FIG. 9]
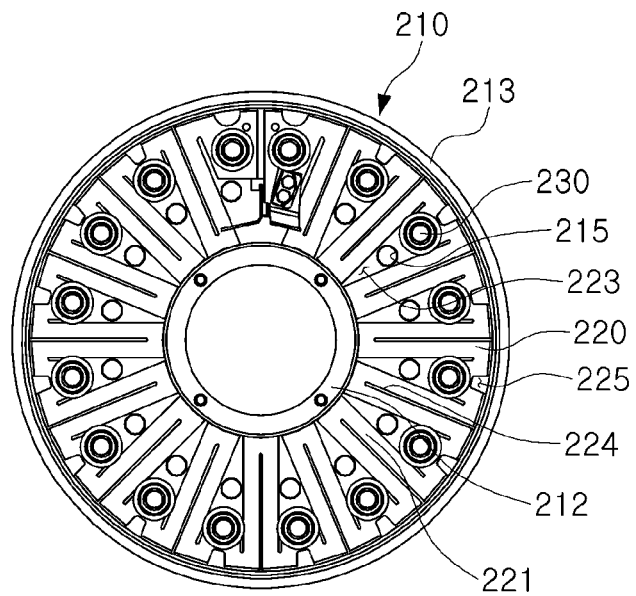
[FIG. 10]
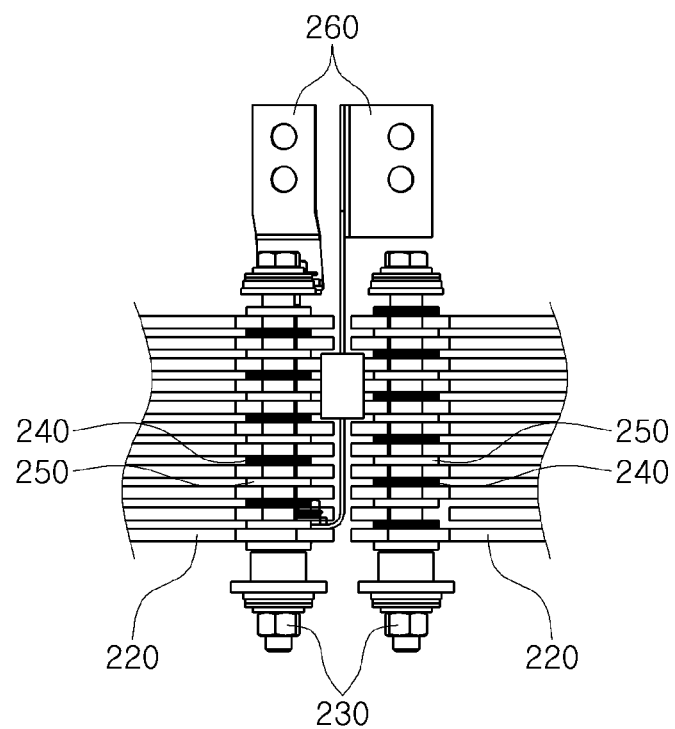

[FIG. 11]
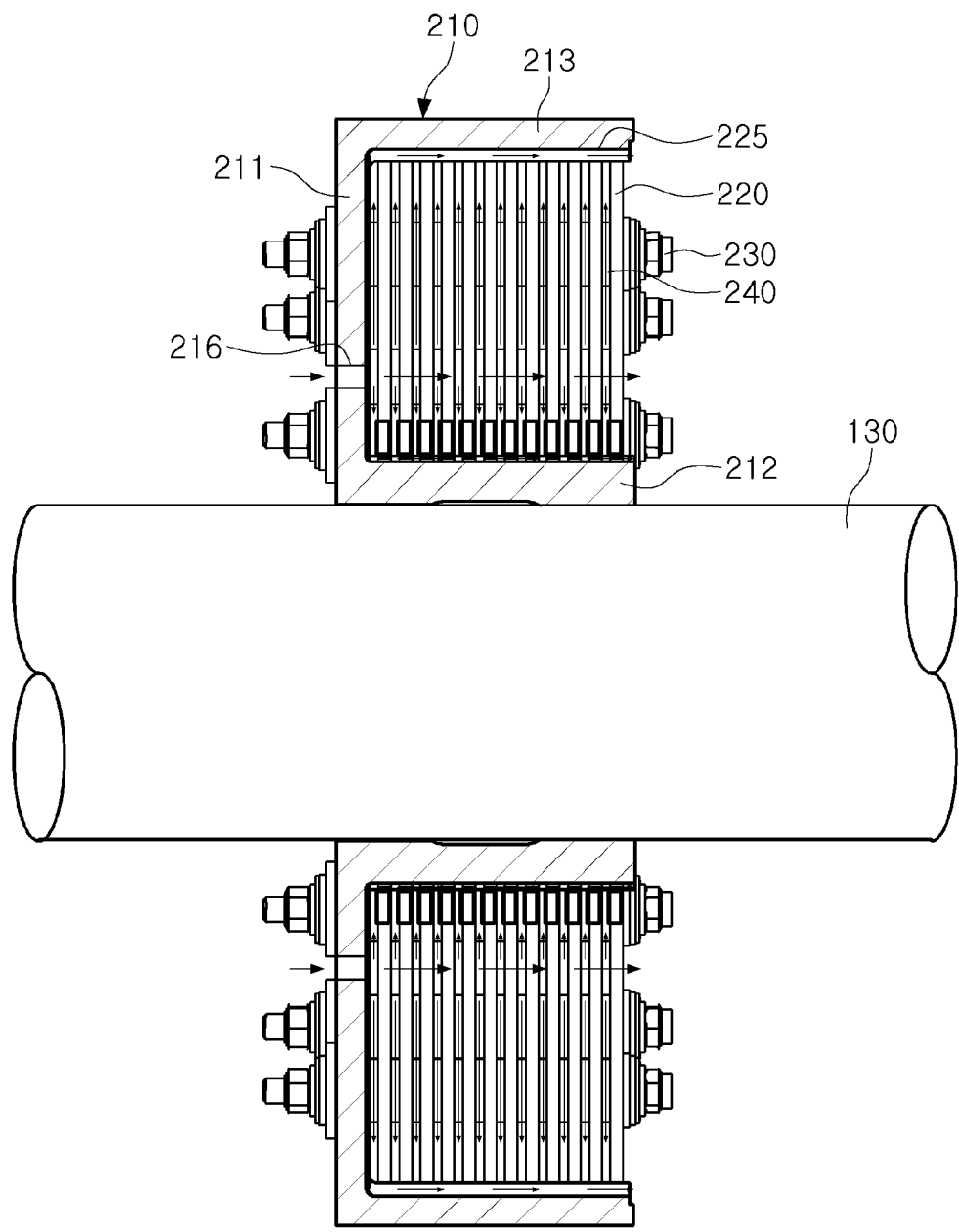

[FIG. 12]
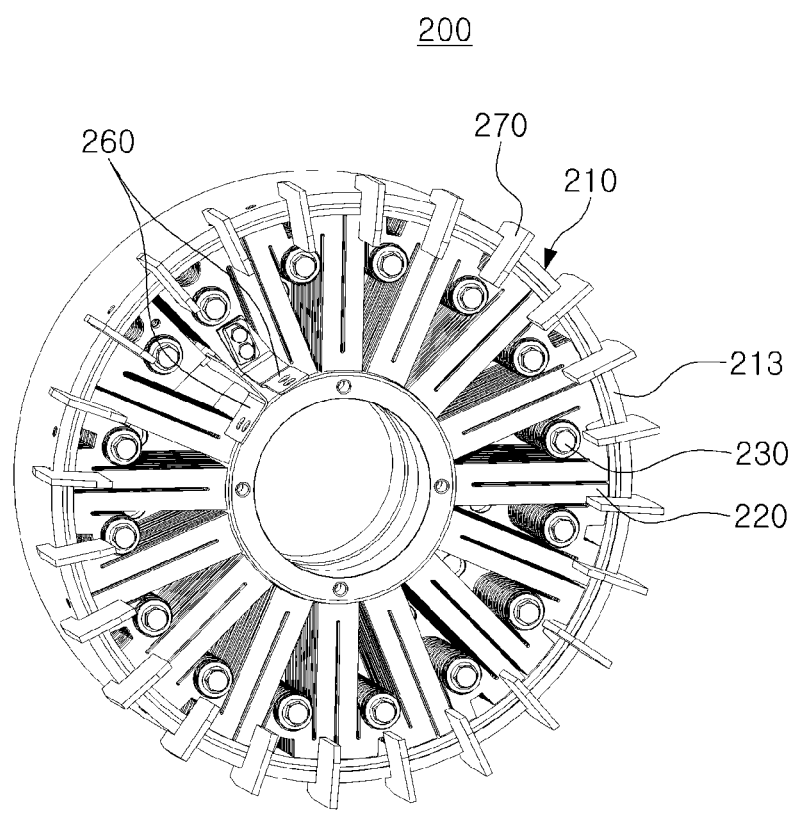

FIELD DISCHARGE RESISTOR UNIT AND SYNCHRONOUS MOTOR INCLUDING SAME

This application is a national phase application under 35 U.S.C. § 371 of PCT International Application No. PCT/KR2017/008964 with an International Filing Date of Aug. 17, 2017, which claims under 35 U.S.C. § 119(a) the benefit of Korean Application No. 10-2016-0105600 filed on Aug. 19, 2016. The entire contents of these applications are incorporated herein by reference in their entirety.

TECHNICAL FIELD

The present disclosure relates to a field discharge resistor unit and a synchronous motor including the same, and more particularly, to a field discharge resistor unit having improved thermal stability and capable of easily adjusting a resistance value and heat capacity, and a synchronous motor including the same.

BACKGROUND ART

A synchronous motor may be a motor configured such that a distributed wound coil is disposed in a stator (an armature), a rotating field may be formed when alternating current power is applied, and the motor may rotate at a velocity the same as a velocity of the rotating field by a magnetic pole applied to the rotating field.

According to a lateral cross-sectional diagram of a synchronous motor illustrated in FIG. 1 of the related art, a synchronous motor may include a field discharge resistor (FDR) 10 coupled to a rotary shaft. The field discharge resistor may reduce a magnitude of current flowing in a coil 20 wound on a rotor such that heat generated when starting the coil wound on a rotor may be reduced, and thermal damage may be prevented.

For example, when a synchronous motor is started in a direct-on-line manner, the synchronous motor may be started based on the same principle as a principle for starting an induction motor. At an earlier stage of the starting, a high voltage may be induced into the coil 20 wound on the rotor of the synchronous motor When a certain level of voltage or more is induced to the coil 20 wound on the rotor, a control module installed in the rotor may short the coil 20 wound on the rotor and may discharge the voltage induced to the coil 20 wound on the rotor.

The field discharge resistor 10 may be connected to the coil 20 wound on a rotor when a current flows through the coil 20 wound on the rotor as the coil is shorted, and the field discharge resistor 10 may reduce a magnitude of current flowing in the coil 20 wound on the rotor to an appropriate level.

Accordingly, heat generated when starting the coil 20 wound on the rotor may be reduced due to the reduced level of current, and thermal damage in insulation may be prevented.

However, referring to a structure of the field discharge resistor 10 illustrated in FIG. 2 of the related art, the field discharge resistor of the related art is configured such that a coil made of copper (Cu) is wound on an internal portion of a cylindrical-shaped hub 11 coupled to a rotary shaft of a motor, and an insulating material 12 surrounds the wound coil. The wound coil may be connected to the coil 20 wound on the rotor, and may function as a resistor.

However, the field discharge resistor 10 of the related art may be vulnerable to cooling when being started, and it is highly likely that thermal damage may occur in insulation, which may degrade operational reliability.

Also, the wound coil type field discharge resistor in the related art is configured such that the wound coil is coated with the insulating material 12, and thus, it may not be easy to adjust a resistance value and heat capacity.

DISCLOSURE

Technical Problem

An aspect of the present disclosure is to address at least one of the above demands or issues occurring in the related art. An aspect of the present disclosure is to provide a field discharge resistor unit having improved thermal stability and capable of easily adjusting a resistance value and heat capacity, and a synchronous motor including the same.

Technical Solution

According to an aspect of the present disclosure, a field discharge resistor unit is provided, a device coupled to a rotary shaft of a synchronous motor and connected to a coil wound on a rotor of the synchronous motor, to reduce a magnitude of an electric current flowing through the coil wound on the rotor, and the field discharge resistor unit includes a hub which has a receiving space therein and is coupled to the rotary shaft of the synchronous motor so that a rotary movement of the hub matches that of the shaft; and at least one conductor disk received in the receiving space of the hub and may function as a resistor when an electric current flows therethrough.

According to another aspect of the present disclosure, a synchronous motor includes a housing; a rotor rotatably provided inside the housing and including a rotor iron core and a coil wound on the rotor; a rotary shaft coupled to the rotor; a stator provided in a circumference of the rotor; an exciter coupled to the rotary shaft and generating excitation power to the coil wound on the rotor; and a field discharge resistor unit coupled to the rotary shaft and electrically connected to the coil wound on the rotor to reduce a magnitude of current flowing through the coil wound on the rotor when the coil wound on the rotor is shorted.

Advantageous Effects

As set forth above, according to an exemplary embodiment in the present disclosure, thermal stability may be secured such that thermal damage caused by consecutively starting a synchronous motor may be reduced, thereby obtaining improved operational reliability of the motor.

Also, according to the exemplary embodiment, a resistance value and thermal capacity may be adjusted by changing the number and shapes of conductor disks.

DESCRIPTION OF DRAWINGS

FIG. 1 is a lateral cross-sectional diagram illustrating a synchronous motor in the related art;

FIG. 2 is a perspective diagram illustrating a field discharge resistor in the related art;

FIG. 3 is a lateral cross-sectional diagram illustrating a synchronous motor according to an exemplary embodiment;

FIG. 4 is a perspective diagram illustrating an assembly structure of a field discharge resistor unit, a rotary shaft, and an exciter according to an exemplary embodiment;

FIG. 5 is a perspective diagram illustrating a field discharge resistor unit according to an exemplary embodiment;

FIG. 6 is an exploded perspective diagram illustrating a field discharge resistor unit illustrated in FIG. 5;

FIG. 7 is a perspective diagram illustrating a hub included in a field discharge resistor unit illustrated in FIG. 5;

FIG. 8 is a diagram illustrating a conductor disk included in a field discharge resistor unit illustrated in FIG. 5, viewed from the front;

FIG. 9 is a diagram illustrating an assembly of a hub and a conductor disk included in a field discharge resistor unit illustrated in FIG. 5, viewed from the front;

FIG. 10 is a plan diagram illustrating an assembly of a coupling bolt, a continuity washer, an insulating washer, and a resistance lead included in a field discharge resistor unit illustrated in FIG. 5;

FIG. 11 is a lateral cross-sectional diagram illustrating air flow characteristics inside a field discharge resistor unit illustrated in FIG. 5; and FIG. 12 is a perspective diagram illustrating a field discharge resistor unit according to another exemplary embodiment.

BEST MODE FOR INVENTION

Terms used in the specification are used to describe a certain exemplary embodiment, and are not intended to limit the present invention. Also, a singular term includes a plural form unless otherwise indicated.

Hereinafter, embodiments of the present disclosure will be described with reference to the accompanied drawings.

In the description below, a field discharge resistor unit 200 according to an exemplary embodiment will be described with reference to FIGS. 3 and 4.

As illustrated in FIGS. 3 and 4, a synchronous motor 100 may include a housing 110, a rotor 120, a rotary shaft 130, a stator 140, an exciter 150, a heat exchanging portion 160, and a field discharge resistor unit 200.

The housing 110 may form an exterior of the synchronous motor 100 in the exemplary embodiment, and may provide an internal space in which the rotor 120, the rotary shaft 130, and the stator 140 are disposed.

The rotor 120 may be rotatably provided in the housing 110, and may include a rotor iron core 122, and a coil 124 wound on the rotor iron core 122.

The rotary shaft 130 may be disposed to penetrate the housing 110, and may be coupled to the rotor 120 such that the rotary shaft 130 may rotate in accordance with rotation of the rotor 120. The rotary shaft 130 may function as a power transferring medium transferring rotational force of the rotor 120 to an external element.

The stator 140 may be provided to surround the rotor 120 inside the housing 110.

The exciter 150 may be disposed on one side of the housing 110 and may be coupled to the rotary shaft 130, and may generate excitation power in the coil 124 wound on the rotor. The exciter 150 may include a wound coil (not illustrated) connected to the coil 124 wound on the rotor. Also, a type and a structure of the exciter 150 are not limited to any particular type and structure, and may be implemented by various forms of exciters installed in the synchronous motor 100 of the related art.

The heat exchanging portion 160 may be provided in an upper end of the housing 110, and may exchange heat inside the housing 110 with external air.

The field discharge resistor unit 200 may be coupled to the rotary shaft 130, and may be electrically connected to the coil 124 wound on the rotor such that, when the coil 124 wound on the rotor is shorted, the field discharge resistor unit 200 may function as a resistor which reduces a magnitude of current flowing through the coil 124 wound on the rotor.

In the exemplary embodiment, the field discharge resistor unit 200 may be disposed between the housing 110 and the exciter 150 as illustrated in FIGS. 3 and 4, but an exemplary embodiment thereof is not limited thereto.

The field discharge resistor unit 200 included in the synchronous motor 100 in the exemplary embodiment may be the field discharge resistor unit 200 in exemplary embodiments described in the descriptions below.

In the description below, the field discharge resistor unit 200 will be described with reference to FIGS. 5 to 12 in accordance with an exemplary embodiment.

The field discharge resistor unit 200 will be described with reference to FIGS. 5 to 11 in accordance with an exemplary embodiment.

As illustrated in FIGS. 5 to 11, the field discharge resistor unit 200 in the exemplary embodiment may include a hub 210, a conductor disk 220, a coupling bolt 230, a continuity washer 240, an insulating material 250, and a resistance lead 260.

The hub 210 may be coupled to a rotary shaft 130 such that a rotational movement of the hub 210 is consistent with that of the rotary shaft 130, and may function as a medium for coupling the conductor disk 220 to the rotary shaft 130.

The hub 210 may have a cylindrical form including a receiving space in which the conductor disk 220 is disposed.

The hub 210 may also include air holes 215 forming air flow channels between an internal space and an external space of the receiving space.

In the exemplary embodiment, the hub 210 may include a coupling plate portion 211, a shaft coupling portion 212, a side wall portion 213, and an insulating material 214.

The coupling plate portion 211 may have a disk plate shape in which a plurality of the air holes 215 are formed, and may include a hollow in which the shaft coupling portion 212 is formed and through which the rotary shaft 130 penetrates.

The air holes 215 may form channels through which air flowing towards the exciter 150 flows into the receiving space of the hub 210 in the housing 110 of the motor.

In the exemplary embodiment, the air hole 215 may be disposed in circular form with a plurality of gaps in a circumferential direction of the hub 210 as illustrated in FIG. 7. However, an exemplary embodiment thereof is not limited thereto. The number and a shape of the air hole 215 may be adjusted in consideration of cooling performance of the conductor disk 220.

Also, in the exemplary embodiment, the coupling plate portion 211 may include a bolt coupling hole 216 to which the coupling bolt 230 is coupled.

The shaft coupling portion 212 may be formed to surround the hollow formed in a central portion of the coupling plate portion 211, and may have a cylindrical shape protruding to one surface of the coupling plate portion 211. The rotary shaft 130 may be inserted to the hollow of the shaft coupling portion 212. The shaft coupling portion 212 may be coupled to the rotary shaft 130 such that a rotational movement of the shaft coupling portion 212 may be consistent with that of the rotary shaft 130.

The side wall portion 213 may have a cylindrical shape extending in a protruding direction of the shaft coupling portion 212 along an edge of the coupling plate portion 211. In the exemplary embodiment, the side wall portion 213 may extend in parallel to the shaft coupling portion 212, but an exemplary embodiment thereof is not limited thereto.

In the configuration above, the receiving space may be surrounded by the coupling plate portion 211, the shaft coupling portion 212, and the side wall portion 213 such that the receiving space may be provided as a circular space having a depth equal to heights of the side wall portion 213 and the shaft coupling portion 212.

The insulating material 214 may be provided on an internal side surface of the coupling plate portion 211, a circumferential surface of the shaft coupling portion 212, and an internal side surface of the side wall portion 213. The insulating material 214 may insulate the conductor disk 220 and the hub 210 from each other.

As an example, the insulating material 214 may be formed of an epoxy material painted on a wall of the receiving space, but an exemplary embodiment thereof is not limited thereto.

The conductor disk 220 may be disposed in the receiving space of the hub 210, and may function as a resistor when a current flows in the conductor disk. The conductor disk 220 may have a circular plate shape.

In the exemplary embodiment, the conductor disk 220 may be configured such that a bar-shaped conductor is bent or curved in a manner in which both ends of the bar-shaped conductor are separated from each other.

For example, the conductor disk 220 may have a circular form in which a single bar-shaped conductor is curved, such that both ends of the bar-shaped conductor may be separated from each other to not be in contact with each other. One end of the both ends, which are not in contact with each other, may be a current inflow end through which a current flows into the conductor disk 220, and the other end may be a current outflow end through which a current flowing in the conductor disk 220 flows out of the conductor disk 220.

In the exemplary embodiment, the conductor disk 220 may have a plurality of spoke portions 221 formed in radial form, which are formed as a single bar-shaped conductor is curved in circular form and is bent in zigzag form.

As an example, the spoke portion 221 may have a "U" shape as illustrated in FIG. 8.

Also, in the exemplary embodiment, a bolt coupling hole 222 to which the coupling bolt 230 is coupled may be formed between the spoke portions 221.

The conductor disk 220 may be configured such that a portion in which the spoke portions 221 and the bolt coupling hole 222 are formed may be repeatedly formed as a pattern.

Also, in the exemplary embodiment, a cutting portion 226 for installing the resistance lead 260 may be formed on the current inflow end and the current outflow end.

As the conductor disk 220 is configured such that a single bar-shaped conductor is bent multiple times to provide a circular form, the conductor disk 220 may have a relatively high resistance value as compared to a size of the conductor disk 220.

In the exemplary embodiment, the conductor disk 220 may include an air gap 223 between the spoke portions 221. The air gap 223 may be disposed to oppose the air hole 215 when the conductor disk 220 is coupled to the hub 210.

Accordingly, air passing through the air hole 215 of the hub 210 may flow into the air gap 223, and thus, disturbance on a flow of air flowing in the receiving space may be prevented such that air may smoothly flow in the receiving space, and a cooling effect generated by air in the conductor disk 220 may be significantly increased.

Also, in the exemplary embodiment, the spoke portion may include an air slot 224 extending in a radial direction of the spoke portion 221. In the exemplary embodiment, the air slot 224 may be formed as a conductor is bent to form the spoke portion 221.

The air slot 224 may serve to improve a thermal exchanging area between the conductor disk 220 and air.

The air slot 224 may allow air flowing into the conductor disk 220, which rotates, to flow in a radial direction of the conductor disk 220 using centrifugal force such that the air slot 224 may serve to diffuse the air to an overall area of the conductor disk 220.

Also, in the exemplary embodiment, the conductor disk 220 may include a plurality of air grooves 225 along an outer circumference. The air grooves 225 may expand a thermal exchanging area between the conductor disk 220 and air, and may form air flow channels through which air may flow in the receiving space in the hub 210.

Due to the plurality of air gaps 223, air slots 224, and air grooves 225, the conductor disk 220 may have a structure in which cooling may be easily performed.

Also, the conductor disk 220 may be formed of a material having excellent thermal stability.

For example, the conductor disk 220 may be formed of a stainless steel material containing 8% to 11% of nickel (Ni) and 18% to 20% of chromium (Cr), but a material of the conductor disk 220 is not limited thereto.

In the field discharge resistor unit 200 in the exemplary embodiment, the conductor disk 220 may be provided as a plurality of conductor disks 220, and the plurality of conductor disks 220 may be stacked in the receiving space of the hub 210.

The plurality of stacked conductor disks 220 may be connected to each other in series. A structure of the serial connection of the plurality of conductor disks 220 will be described later.

The field discharge resistor unit 200 may be configured such that a resistance value and heat capacity may be easily adjusted by changing the number of the stacked conductor disks 220.

As illustrated in FIG. 6, the coupling bolt 230 may collect the plurality of conductor disks 220 and may couple the plurality of conductor disks 220 to the coupling plate portion 211 of the hub 210. When the number of the conductor disks 220 is changed, the stacked conductor disks 220 may be fixed by using a coupling bolt 230 of a different length or by coupling a nut (not illustrated) to a central portion of the coupling bolt 230.

The continuity washer 240 may be coupled to the coupling bolt 230 and may connect adjacent conductor disks 220 to each other in series.

In the exemplary embodiment, the continuity washers 240 may be included in two coupling bolts 230 coupled to the current inflow end and the current outflow end of the conductor disk 220 as illustrated in FIGS. 6 and 10.

As illustrated in FIG. 10, the continuity washers 240 may be disposed on current inflow ends of first and second conductor disks 220, may be disposed on current outflow ends of second and third conductor disks 220, and may be disposed on current inflow ends of third and fourth conductor disks 220 such that the continuity washers 240 may connect the plurality of conductor disks 220 to each other in series.

The insulating material 250 may insulate a space between the conductor disks 220.

In the exemplary embodiment, the insulating material 250 may be configured to be an insulating washer coupled to the coupling bolt 230 and disposed between the conductor disks 220 as illustrated in FIGS. 6 and 10.

The insulating material 250 may form a gap between the conductor disks 220 in which air may flow.

In the exemplary embodiment, the insulating material 250 may be installed in a portion other than a portion in which the continuity washer 240 is disposed between the conductor disks 220.

The resistance lead 260 may be connected to the current inflow end and the current outflow end of the conductor disk 220 such that the resistance lead 260 may electrically connect the conductor disk 220 to the coil 124 wound on a rotor of the synchronous motor 100. The resistance lead 260 may be installed to be inserted into the cutting portion 226 formed in the conductor disk 220.

In the exemplary embodiment, the resistance lead 260 may be provided as a pair of leads including a lead, a channel through which a current flows into the plurality of conductor disks 220, and a lead, a channel through which a current flows out of the plurality of conductor disks 220.

Also, in the exemplary embodiment, the resistance lead 260 may be connected to the exciter 150 connected to the coil 124 wound on the rotor of the synchronous motor 100, and may be connected to the coil 124 wound on the rotor of the synchronous motor 100 by means of the exciter 150. However, an exemplary embodiment thereof is not limited thereto.

Meanwhile, as illustrated in FIG. 11, air flowing towards the field discharge resistor unit 200 in the exemplary embodiment, viewing from a housing 110 of the synchronous motor 100, may pass through the air holes 215 of the hub 210 and may flow into the receiving space. The air flowing into the receiving space may flow in a shaft direction of the rotary shaft 130 through the air gaps 223 and the air slots 224 formed in the plurality of conductor disks 220 such that the air may emit heat from the plurality of conductor disks 220.

Air may also flow in a radial direction of the conductor disk 220 through gaps among the plurality of conductor disks 220, and the air flowing in the radial direction may flow in a shaft direction of the rotary shaft 130 through the air grooves 225 and may be discharged externally of the hub 210.

The field discharge resistor unit 200 in the exemplary embodiment may be configured such that a disk-type resistor may exchange heat with air, thereby improving thermal stability when being started.

FIG. 12 illustrates a field discharge resistor unit 200 in accordance with another exemplary embodiment.

As illustrated in FIG. 12, the field discharge resistor unit 200 according to another exemplary embodiment may further include fan blades 270 as compared to the field discharge resistor unit 200 in the aforementioned exemplary embodiment described with reference to FIGS. 3 to 11.

The fan blades 270 may be coupled to a hub 210, and may rotate in accordance with rotation of the hub 210 to forcibly generate air flows inside a receiving space.

In the exemplary embodiment, a plurality of the fan blades 270 may be provided on one end of a side wall portion 213 of the hub 210 along a circumference of the hub 210 as illustrated in FIG. 12.

The fan blades 270 may rotate in accordance with a rotation of the hub 210 and may generate air flows. In other words, the plurality of fan blades 270 provided in the hub 210 may function as a fan, and may improve a velocity and the amount of air flowing in the receiving space of the hub 210.

In the exemplary embodiment, the fan blades 270 may have a plate form extending in a shaft direction of the rotary shaft 130 as illustrated in FIG. 12, or may have various forms such as a sloped plate, a distorted plate, and the like, which can generate air flows when rotating.

Through the fan blades 270, cooling performance of the conductor disk 220 provided in the hub 210 may improve.

While the example embodiments have been shown and described above, it will be apparent to those skilled in the art that modifications and variations could be made without departing from the scope of the present inventive concept as defined by the appended claims.

The invention claimed is:

1. A field discharge resistor unit coupled to a rotary shaft of a synchronous motor and connected to a coil wound on a rotor of the synchronous motor to reduce a magnitude of current flowing through the coil wound on the rotor, the field discharge resistor unit comprising:
   a hub coupled to the rotary shaft of the synchronous motor such that a rotational movement of the hub is consistent with a rotational movement of the rotary shaft, and including a receiving space in the hub; and
   at least one conductor disk received in the receiving space of the hub and functioning as a resistor when a current flows in the conductor disk,
   wherein the hub comprises:
   a plate-shaped coupling plate portion;
   a shaft coupling portion protruding from a central portion of the coupling plate portion and coupled to the rotary shaft;
   a side wall portion extending in a protruding direction of the shaft coupling portion along an edge of the coupling plate portion; and
   air holes forming air flow channels between an internal space and an external space of the receiving space.

2. The field discharge resistor unit of claim 1, wherein the hub includes an insulating material provided on an internal side surface of the coupling plate portion, a circumferential surface of the shaft coupling portion, and an internal side surface of the side wall portion.

3. The field discharge resistor unit of claim 1, wherein the conductor disk is configured such that a bar-shaped conductor is bent or curved for both ends of the bar-shaped conductor to be separated from each other.

4. The field discharge resistor unit of claim 3, wherein the conductor disk has a plurality of spoke portions formed in radial form as the bar-shaped conductor is bent in zigzag form.

5. The field discharge resistor unit of claim 4,
   wherein the conductor disk includes air gaps among the spoke portions, and
   wherein the air gaps and the air holes oppose to each other.

6. The field discharge resistor unit of claim 4, wherein the spoke portions have air slots extending in a radial direction of the conductor disk.

7. The field discharge resistor unit of claim 3, wherein the conductor disk includes a plurality of air grooves formed along an outer circumference of the conductor disk.

8. The field discharge resistor unit of claim 1, wherein the field discharge resistor unit includes a plurality of the conductor disks which are stacked.

9. The field discharge resistor unit of claim 8, wherein the plurality of conductor disks are connected to each other in series.

10. The field discharge resistor unit of claim 9, further comprising:
a coupling bolt collecting the plurality of conductor disks and coupling the plurality of conductor disks to the coupling plate portion; and
a continuity washer coupled to the coupling bolt and connecting adjacent conductor disks of the plurality of conductor disks to each other in series.

11. The field discharge resistor unit of claim 9, further comprising:
an insulating material insulating spaces among the conductor disks.

12. The field discharge resistor unit of claim 1, further comprising:
a resistance lead connected to a current inflow end and a current outflow end of the conductor disk and electrically connecting the conductor disk to the coil wound on the rotor of the synchronous motor.

13. The field discharge resistor unit of claim 1, further comprising:
fan blades coupled to the hub and rotating in accordance with rotation of the hub to forcibly generate air flows into the receiving space.

14. The field discharge resistor unit of claim 1, wherein the conductor disk is formed of a stainless steel material containing 8% to 11% of nickel (Ni) and 18% to 20% of chromium (Cr).

15. A synchronous motor, comprising:
a housing;
a rotor rotatably provided in the housing and including a rotor iron core and a coil wound on the rotor;
a rotary shaft coupled to the rotor;
a stator provided in a circumference of the rotor;
an exciter coupled to the rotary shaft and generating excitation power to the coil wound on the rotor; and
a field discharge resistor unit in claim 1, configured to be coupled to the rotary shaft and electrically connected to the coil wound on the rotor to reduce a magnitude of current flowing through the coil wound on the rotor when the coil wound on the rotor is shorted.

* * * * *